United States Patent

Wu et al.

[11] Patent Number: 6,050,831
[45] Date of Patent: Apr. 18, 2000

[54] METHOD OF SELECTABLE CONNECTING DIFFERENT DATE ACCESS DEVICE TO THE SAME CIRCUIT BOARD AND RELATED CONNECTOR MODULE

[75] Inventors: Jerry Wu, Chang-Hua Hsien; Jia-Hung Liu, Taipei Hsien, both of Taiwan

[73] Assignee: Hon Hai Precision Ind. Co., Ltd., Taipei Hsien, Taiwan

[21] Appl. No.: 09/104,867

[22] Filed: Jun. 26, 1998

[30] Foreign Application Priority Data

Nov. 12, 1997 [TW] Taiwan ................................. 86118862

[51] Int. Cl.$^7$ .................................................. H01R 12/00
[52] U.S. Cl. .......................................... 439/76.1; 439/638
[58] Field of Search .................... 439/76.1, 653, 439/638

[56] References Cited

U.S. PATENT DOCUMENTS 4,850,899  7/1989  Maylnard .............................. 439/628
5,816,861  10/1998  Cheng ................................. 439/653

FOREIGN PATENT DOCUMENTS 2 115 989  9/1983  United Kingdom ........... H01R 33/94

Primary Examiner—Renee S. Luebke
Assistant Examiner—T C Patel

[57] ABSTRACT

A method of interconnecting a data access device to a main board for notebook computers without requiring a flexible printed circuit assembly and a connector module. The method involves interconnecting a simple circuit board between a connector interfacing the data access device and a connector interfacing the main board. The circuit board serves to convert the number of contacts of one of the two connectors to be in electrical and mechanical conformity with the number of pins of the other connector. The connector module employs the circuit board which is adapted to be directly interconnected between the first and second connectors.

4 Claims, 7 Drawing Sheets

6,050,831

METHOD OF SELECTABLE CONNECTING DIFFERENT DATE ACCESS DEVICE TO THE SAME CIRCUIT BOARD AND RELATED CONNECTOR MODULE

BACKGROUND OF THE INVENTION

The present invention relates to a method of selectably connecting different data access devices to the same circuit board and a relevant connector module and, more particularly, to a method of selectively connecting two different types of hard disk drives (HDD) to the same circuit board and a connector module for achieving such selective connection.

There are generally two types of HDDs for notebook computers, namely the 2.5" HDD and the 3" HDD. Since the interconnection between each of the two types of HDDs and an associated main board is specially designed, e.g. the 2.5" HDD is equipped with an adapter of 44 (forty-four) pins to connect to a header of a first type equipped on the associated main board and the 3" HDD is equipped with an adapter of 50 (fifty) pins to connect to a header of a second type equipped on the associated main board, either type of HDD can only be connected to a corresponding one of two types of headers respectively equipped on two different main boards, but not vice versa.

Typically, the connection of a HDD to a main board is achieved via a flexible printed circuit assembly. For example, as shown in FIG. 1, to connect a 2.5" HDD 110 to an associated main board 199, a flexible printed circuit assembly consisting of a flexible printed circuit 150 and two insulation displacement connectors 120, 130 on both ends of the flexible printed circuit 150 is required. Similarly, as shown in FIG. 2, to connect a 3" HDD 10 to an associated main board 99, a flexible printed circuit assembly consisting of a flexible printed circuit 50, one header 20 and one header socket 30 on both ends of the flexible printed circuit 50 is required. However, the use of a flexible printed circuit is not economical due to its high cost and, moreover, the removal of the HDD is cumbersome because it can only be done after the enclosure or case enclosing the HDD is removed and the flexible printed circuit assembly is disconnected from the HDD.

It would be advantageous to be able to selectably use either a 2.5" HDD or a 3" HDD with the same main board and to eliminate the need for a flexible printed circuit from the viewpoint of either versatility or cost-saving.

BRIEF SUMMARY OF THE INVENTION

One object of the present invention is to provide a method of interconnecting a data access device to a main board by converting the number of contacts of a first connector connected to the data access device to be equal to the number of pins of a second connector connected to the main board by means of a simple circuit board. In this way, the use of an expensive flexible printed circuit assembly is eliminated.

Another object of the present invention is to provide a connector module comprising: a first connector having a given number of contacts received thereon and being directly connectable to a main board; a second connector having a given number of pins received thereon and being directly connectable to a data access device, the number of pins of the second connector being different from the number of contacts of the first connector; and a circuit board directly connecting and electrically mating the second connector to the first connector. Other objects, advantages and novel features of the invention will become more apparent from the following detailed description when taken in conjunction with the accompanying drawings.

DETAILED DESCRIPTION OF THE INVENTION

Figure 3:
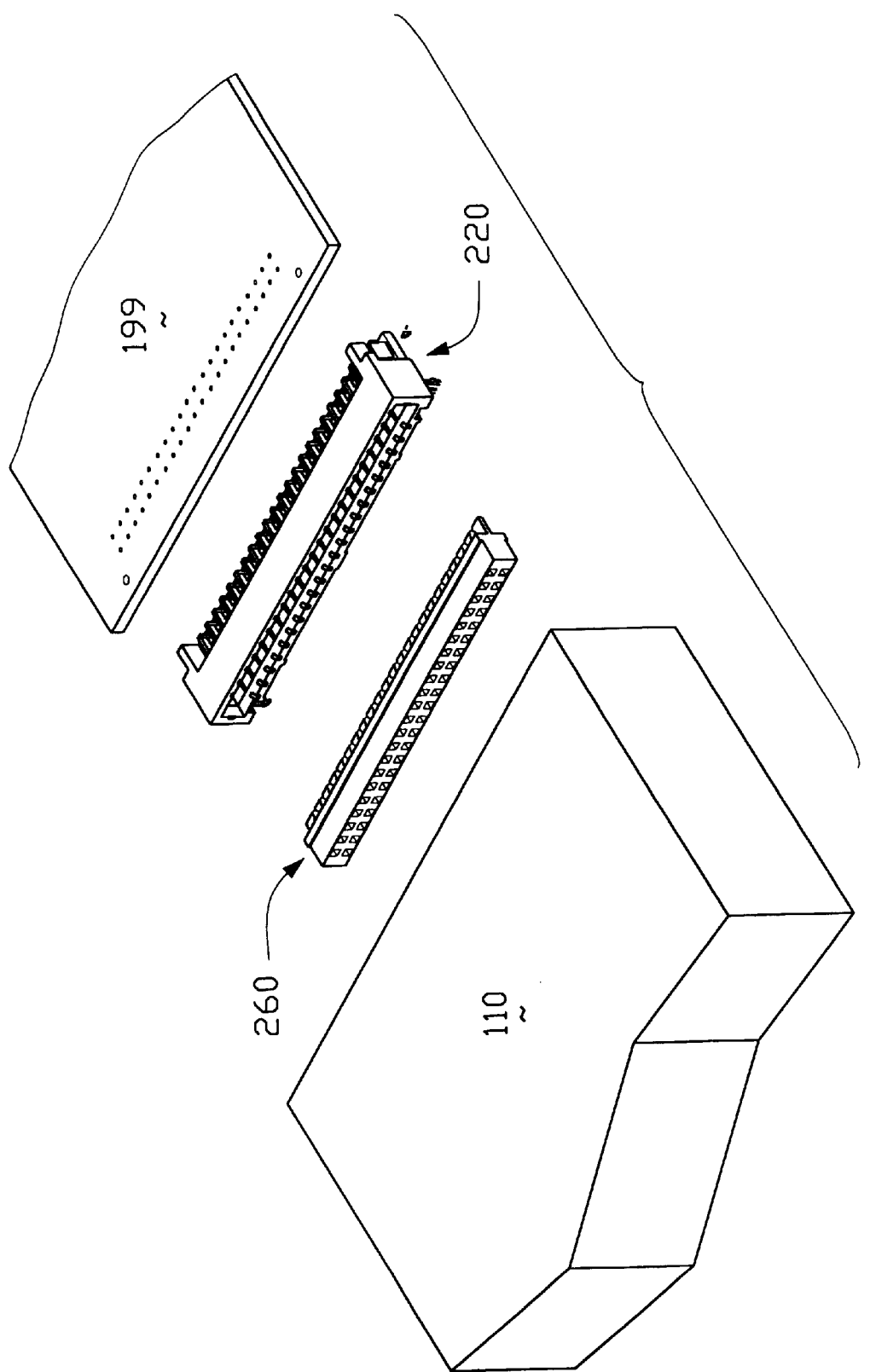
FIG. 3 is an exploded perspective view showing a connector module in accordance with the present invention as applied for connecting a 2.5" HDD to a main board.
Figure 4:
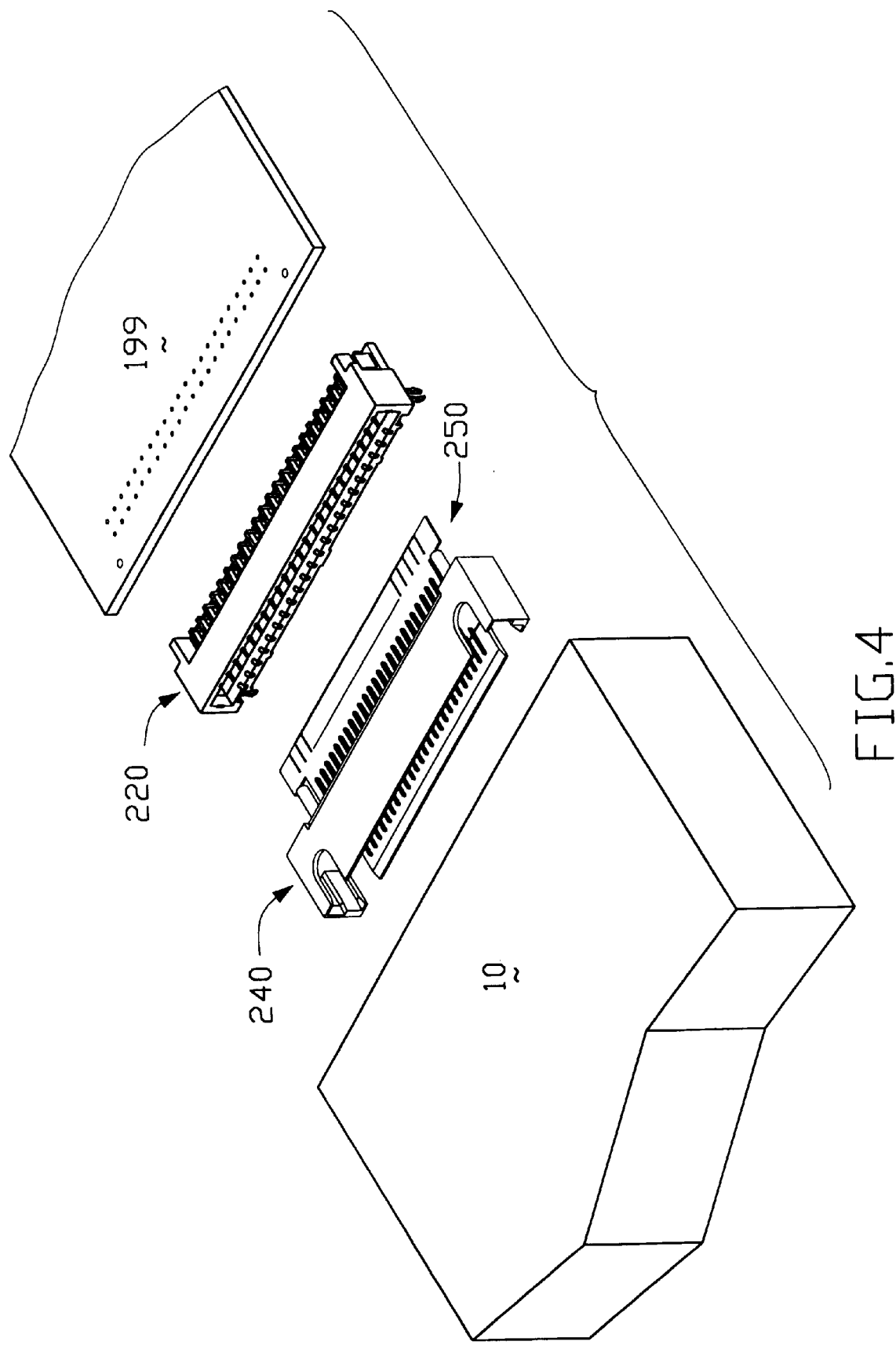
FIG. 4 is an exploded perspective view showing a connector module in accordance with the present invention as applied f or connecting a 2.5" HDD to a main board.

Referring to the drawings and initially to FIGS. 3 and 4, to interchangeably connect different data access devices, e.g. a 2.5" HDD and a 3" HDD, to same circuit board, e.g. the main board 199, in accordance with the present invention, a connector module is provided, respectively. Each connector module has a first connector 220 for connecting to the main board 199 and a second connector 260 (for the case of 2.5" HDD) or 240 (for the case of 3" HDD) for connecting to the associated HDD. The connector module for connecting the 3" HDD to the main board 199 further has a circuit board 250 for interconnecting the connectors 220, 240, as will be further described later.

Figure 5:
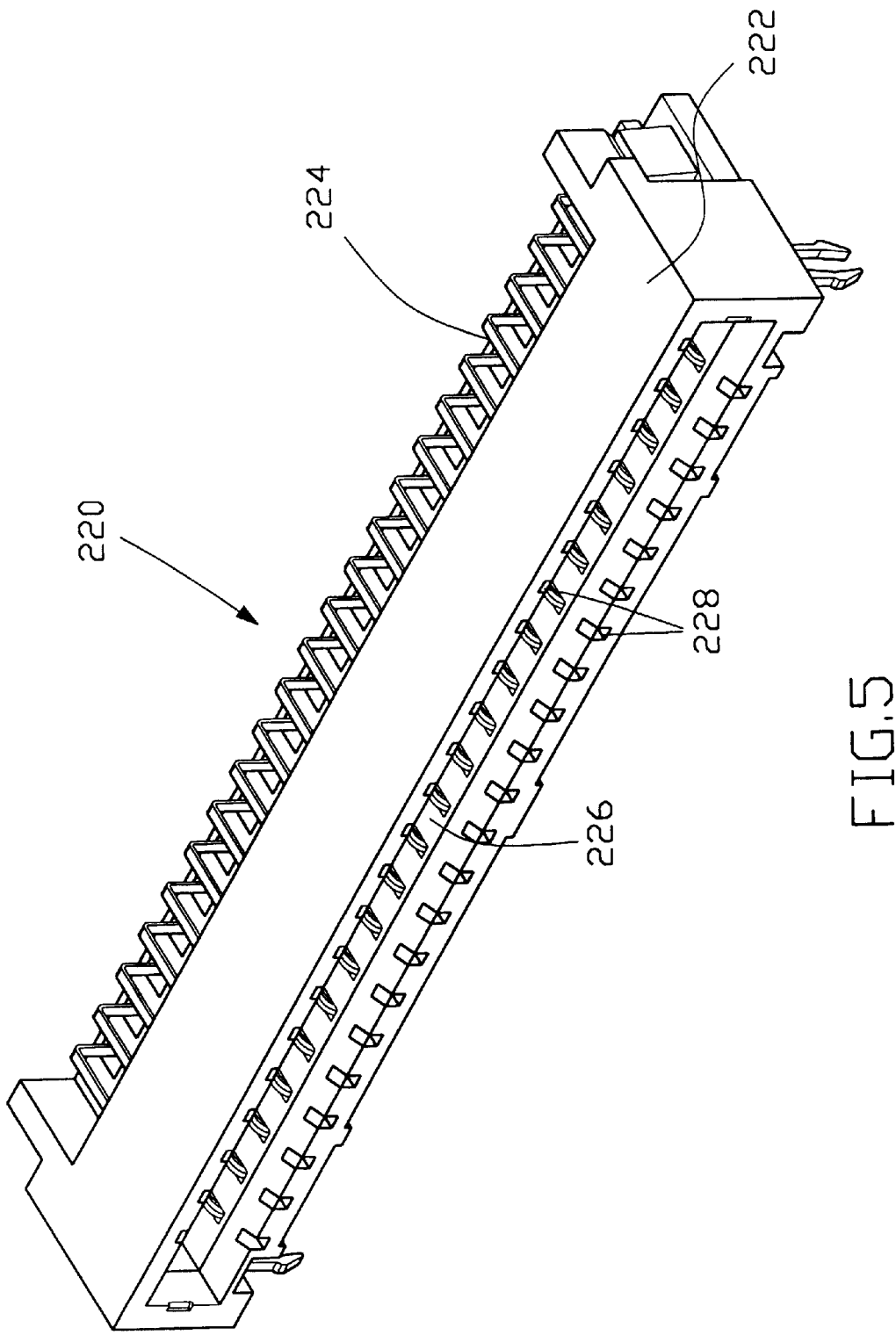
FIG. 5 shows a receptacle common to both the connector modules of FIGS. 3 and 4.
Figure 6:
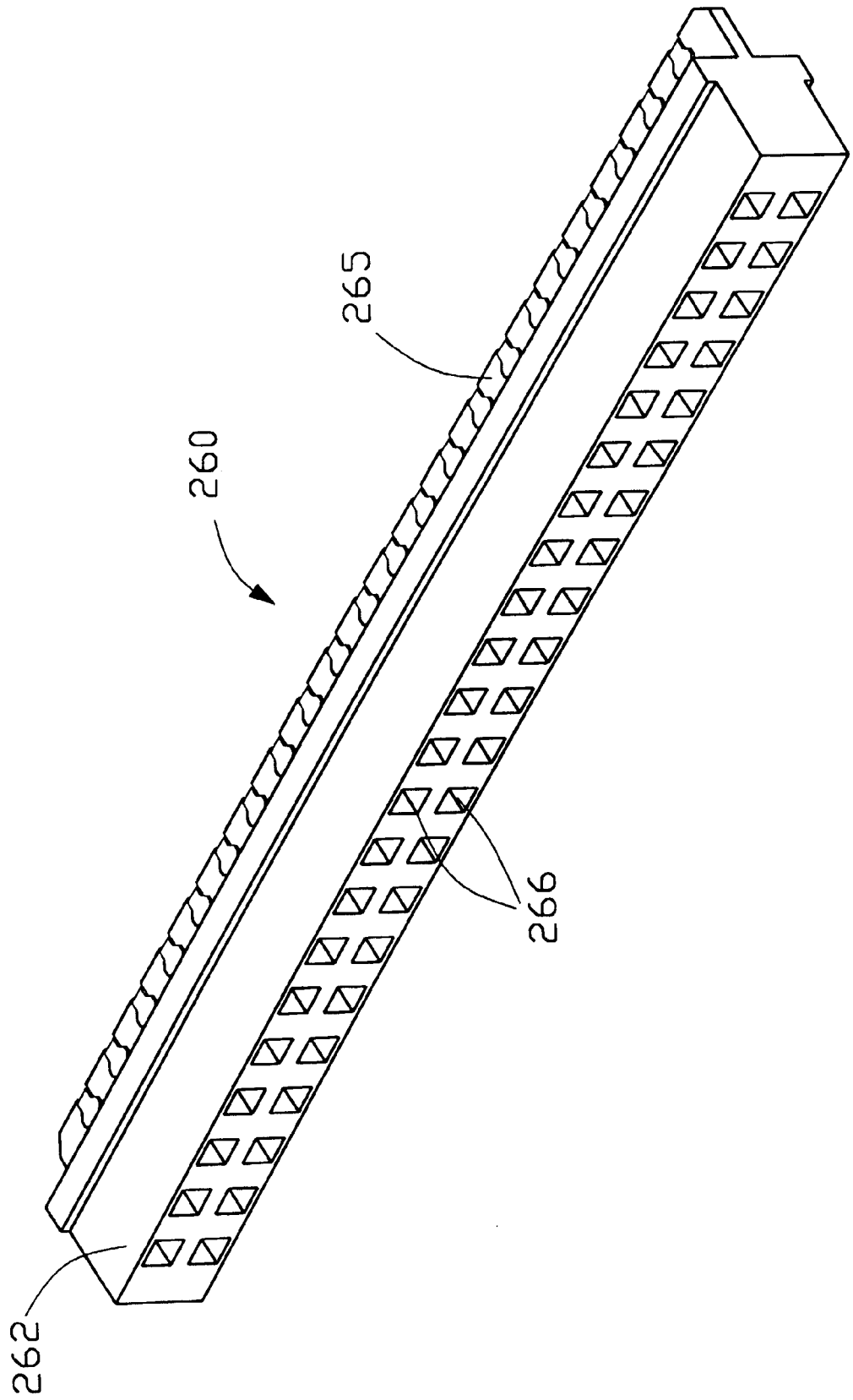
FIG. 6 shows an adapter of the connector module of FIG. 3.

Referring to FIGS. 5 and 6, the first connector 220 formed as a receptacle comprises an insulative body 222 defining a slot 226 and two rows of passageways 228. Each passageway 228 receives a corresponding contact 224 which has one end (not numbered) exposed to the slot 226 and has the other end (not being visible in the drawing) exposed to an exterior of the body 222. The second connector 260 for connecting to the 2.5" HDD and formed as a socket comprises an insulative body 262 defining two opposite portions for respective engagement with the corresponding mating portions of the 2.5" HDD and of the first connector 220 wherein the second connector 260 defines two rows of passageways 266 for accommodating associated pins 265. The pins 265 make electrical contact with the contacts 224 when the second connector 260 is connected to the first connector 220. In the present embodiment, the first connector 220 and the second connector 260 have forty-four (44) contacts 224 and pins 265, respectively.

Figure 1:
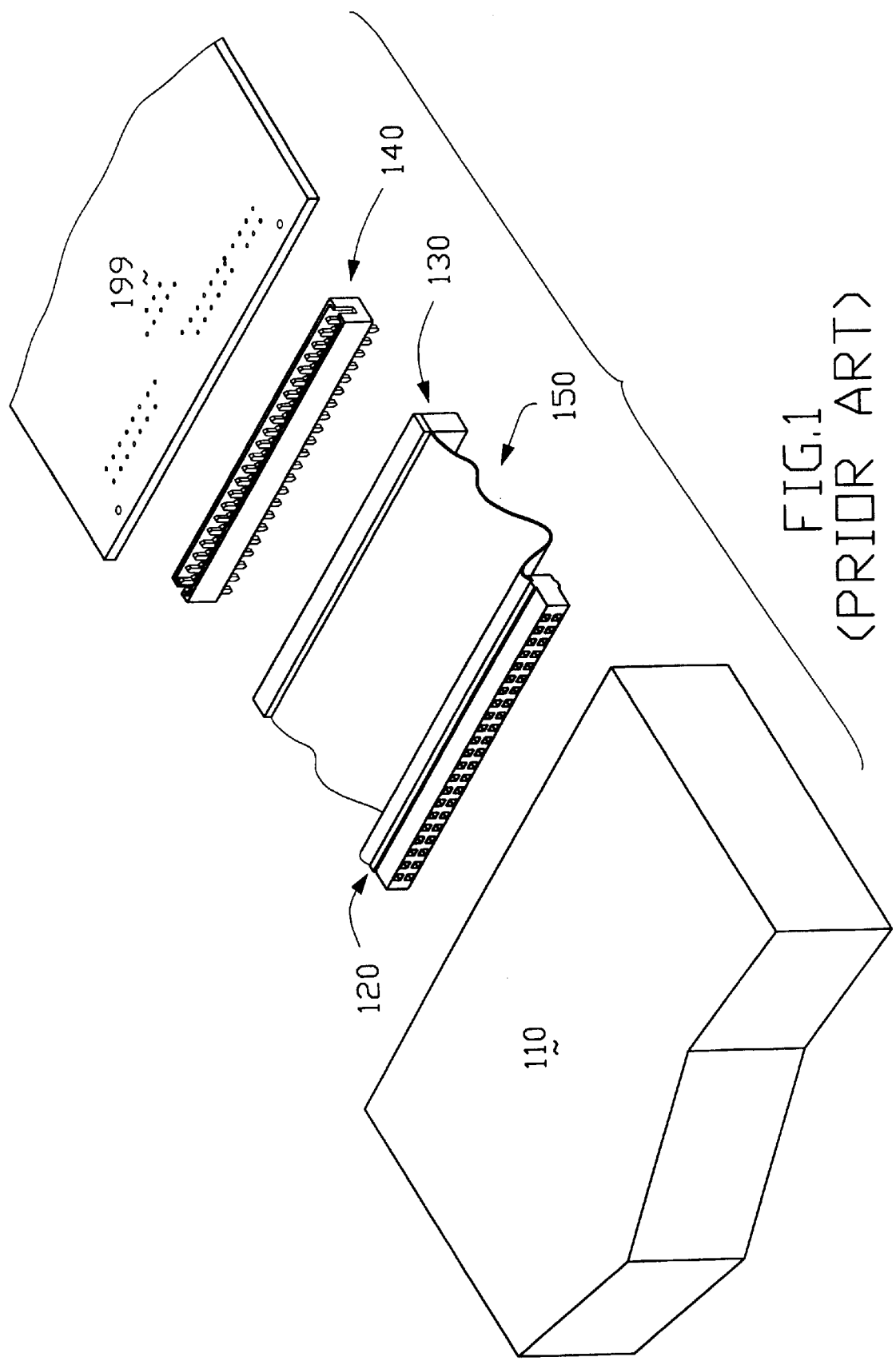
FIG. 1 is an exploded perspective view depicting a flexible printed circuit assembly for connecting a 2.5" HDD to a main board according to a conventional design.
Figure 2:
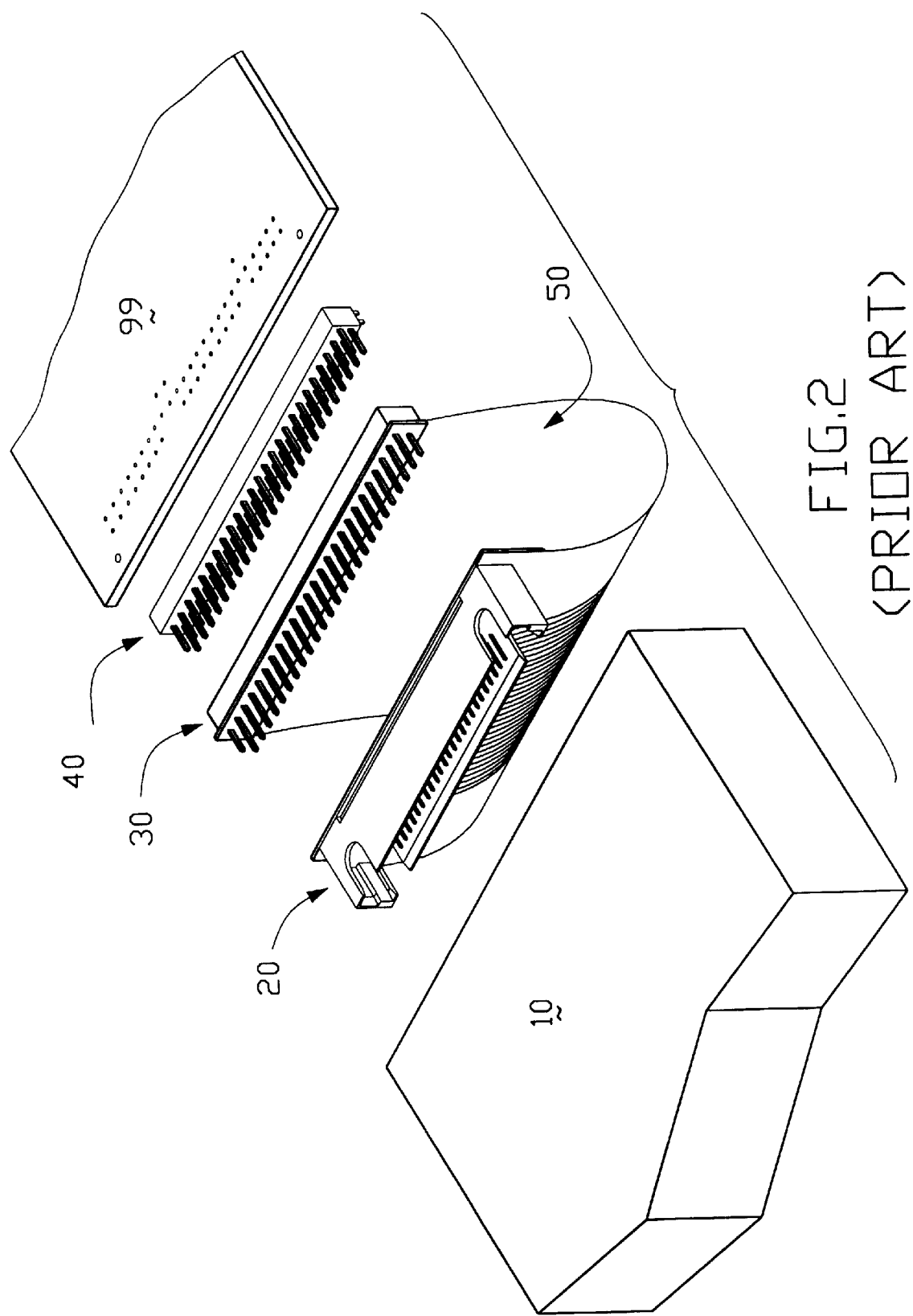
FIG. 2 is an exploded perspective view depicting a flexible printed circuit assembly for connecting a 3" HDD to a main board according to a conventional design.
Figure 7:
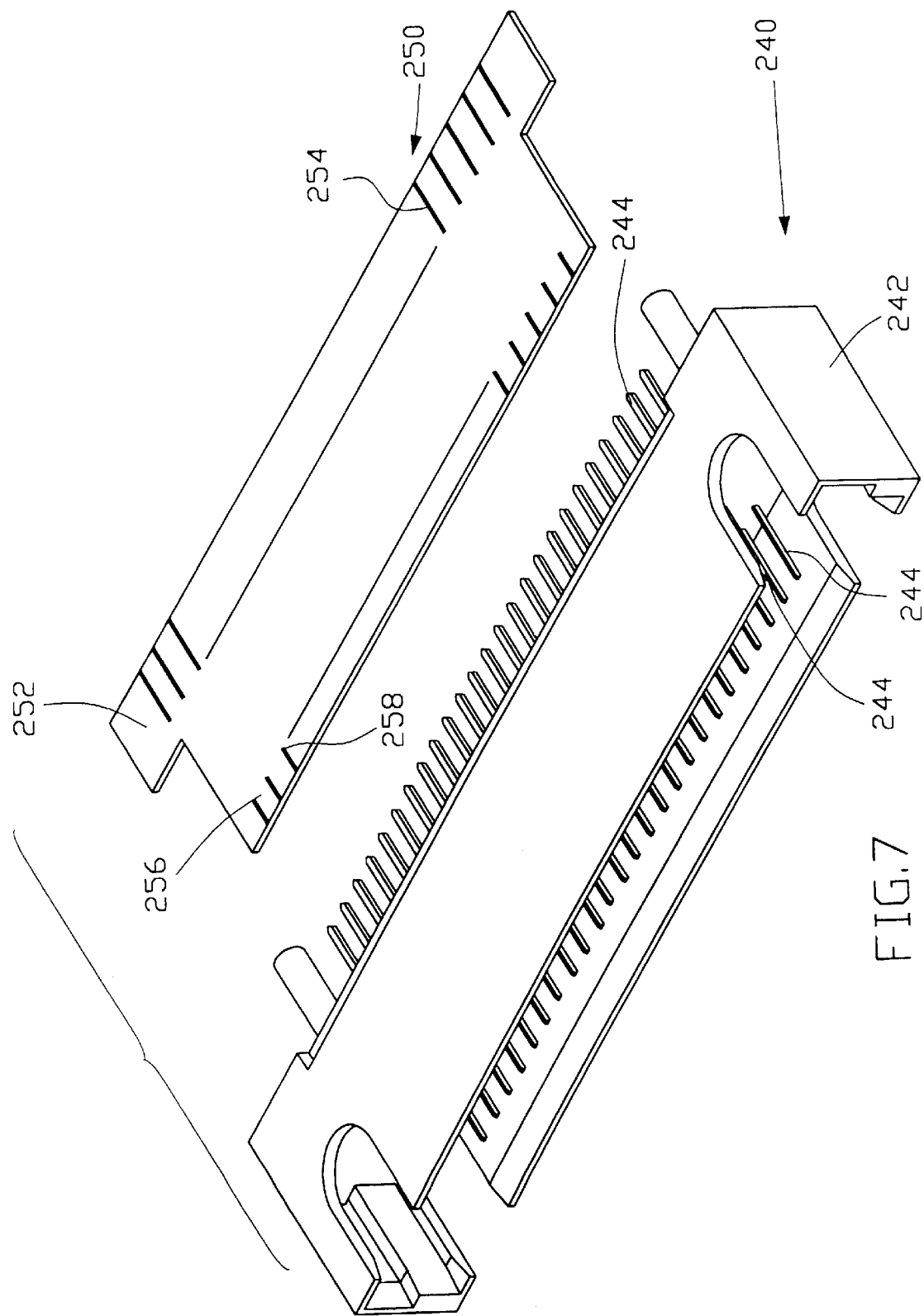
FIG. 7 shows an adapter and a circuit board of the connector module of FIG. 4.

FIG. 7 shows the connector 240 in the form of an adapter (i.e., a first portion which is adapted to be mated with the mating portion of the 3" HDD), and the circuit board 250 (i.e., a second portion which is adapted to be mated with the first connector 220), for establishing interconnection between the connectors 220 and 240 as mentioned above. The adapter 240 comprises an insulative body 242 and two rows of pins 244 received therein (only one row of pins being visible in the drawing). The circuit board 250 has a first edge 252 which has a plurality of conducting trails 254, on two opposite sides of the board, corresponding in number to the contacts 224 of the first connector 220 and a second edge 256 which has a plurality of conducting trails 258, on two opposite sides of the board, corresponding in number to the pins 244 of the second connector 240. The first edge 252 of the circuit board 250 is shaped to be firmly secured between the two rows pins 244, while the second edge 256 is adapted to be securely inserted into slot 226 of the connector 220. The internal circuitry and construction of the circuit board 250 is generally of a known design therefore a detailed description thereof not disclosed herein. In the present embodiment, the connector 240 has fifty (50) pins 244. The circuit board 250 therefore enables it possible to electrically couple the connector 240 to the connector 220 where the first and second connectors have different number of pins or contacts, namely, the connector 220 has forty-four (44) contacts while the connector 240 has fifty (50) pins 244. With this arrangement, use of an expensive flexible printed circuit assembly, as is required by prior designs shown in FIGS. 1 and 2 when employing different HDDs, is eliminated.

Is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An interconnection system for selectively electrically connecting different first and second data access devices to a single PC board, comprising:

an accommodation connector directly mounted to said PC board;

a first interface connector defining two opposite portions respectively mating with said first data access device and said accommodation connector under a condition that said accommodation connector is not able to mate with the first data access device directly; and a second interface connector, which is significantly different from the first interface connector, defining two opposite portions respectively mating with said second data access device and said accommodation connector under a condition that said accommodation connector is not able to mate with the second data access directly; whereby the PC board with the accommodation connector can selectively mate with the first data access device or the second data access device.

2. The interconnection system as claimed in claim 1, wherein the first data access device is a 2.5" HDD and the second data access device is a 3" HDD.

3. The interconnection system as claimed in claim 1, wherein one of said first data access device and said second data access device has a different number of contacts to the accomodation connector.

4. The interconnection system as claimed in claim 3, wherein one of said first interface connector and said second interface connector which mates with said one data access device having the different number of contacts to the accomodation connector, includes a PC board for transformation of contact arrangement between the accomodation connector and the said one data access device.

* * * * *